United States Patent [19]

Armbruster et al.

[11] Patent Number: 4,530,959
[45] Date of Patent: Jul. 23, 1985

[54] PNEUMATIC TIRE WITH TREAD OF MEDIUM VINYL POLYBUTADIENE/RUBBER BLEND

[75] Inventors: Robert G. Armbruster, Wadsworth, Ohio; Richard M. Scriver, Luxembourg, Luxembourg

[73] Assignee: The Goodyear Tire & Rubber Company, Akron, Ohio

[21] Appl. No.: 587,731

[22] Filed: Mar. 8, 1984

[51] Int. Cl.$^3$ .............. B60C 1/00; C08L 9/00; C08L 7/00; C08L 9/06
[52] U.S. Cl. .................. 524/526; 152/209 R; 152/564; 525/236; 525/237
[58] Field of Search ............. 524/526; 525/237, 236; 152/209 R, 330 R

[56] References Cited

U.S. PATENT DOCUMENTS

| | | | |
|---|---|---|---|
| 3,280,084 | 10/1966 | Zelinski et al. | 260/85.7 |
| 3,301,840 | 1/1967 | Zelinski | 260/94.2 |
| 3,363,659 | 1/1968 | Kechter et al. | 152/330 |
| 3,725,331 | 4/1973 | Lesage et al. | 260/33.6 AQ |
| 3,937,681 | 2/1976 | Nordsiek | 524/571 |
| 4,192,366 | 3/1980 | Scriver, Jr. et al. | 525/236 |
| 4,230,841 | 10/1980 | Prudence | 526/180 |
| 4,259,218 | 3/1981 | Haws | 525/236 |
| 4,309,318 | 1/1982 | Ahagon et al. | 525/237 |
| 4,310,582 | 1/1982 | Stumpe, Jr. | 525/237 |
| 4,383,085 | 5/1983 | Fujimaki et al. | 525/237 |
| 4,398,582 | 8/1983 | Yuto et al. | 525/237 |
| 4,417,005 | 11/1983 | Tokieda et al. | 524/526 |

FOREIGN PATENT DOCUMENTS

| | | |
|---|---|---|
| 2158575 | 11/1971 | Fed. Rep. of Germany . |
| 1166832 | 10/1969 | United Kingdom . |
| 1261371 | 1/1972 | United Kingdom . |
| 1320945 | 6/1973 | United Kingdom . |
| 2046277 | 11/1980 | United Kingdom . |

OTHER PUBLICATIONS

Nardsick, *Polymer Age*, Sep. 1973, pp. 332–337.

*Primary Examiner*—Allan M. Lieberman
*Attorney, Agent, or Firm*—H. C. Young, Jr.

[57] ABSTRACT

A pneumatic tire with a sulfur cured elastomeric tread composition comprised of medium vinyl polybutadiene cis 1,4-polyisoprene rubber and styrene/butadiene copolymer rubber.

12 Claims, No Drawings

PNEUMATIC TIRE WITH TREAD OF MEDIUM VINYL POLYBUTADIENE/RUBBER BLEND

FIELD OF INVENTION

This invention relates to tires. The invention particularly relates to pneumatic rubber tires having a rubber tread composition.

BACKGROUND OF THE INVENTION

Pneumatic rubber passenger and truck tires are composed of elements which conventionally include a tread of a rubber composition. The tread rubber is sometimes desirably compounded to provide a tire with a relatively low rolling resistance with reasonable wear and traction.

Although it is desired to compound the tire's tread composition to reduce the rolling resistance of the tire without substantially degrading the tire's traction features, usually tire traction is often expected to be somewhat sacrificed as may be evidenced by its decrease in wet and dry skid resistance.

Various rubber compositions have been prepared for various purposes, some of which have included tire treads, which compose a polybutadiene containing a degree of 1,2-monomer configuration, sometimes referred to as vinyl content. Representative of such various compositions include those, for example, taught in various patent specifications such as U.S. Pat. No. 3,937,681 relating to a tire tread of polybutadiene containing twenty-five to fifty percent of its monomer units in a 1,2-position, British patent No. 1,166,832 relating to a tire tread of "high vinyl" butadiene rubber containing at least fifty percent of 1,2-addition, U.S. Pat. No. 4,192,366 relating to a tire tread of polyisoprene and medium vinyl polybutadiene rubbers, U.S. Pat. No. 4,259,218 relating to a composition of "medium vinyl" polybutadiene and blends thereof with natural rubber where such composition is required to contain a certain carbon black, U.S. Pat. No. 3,978,165 relating to a composition, taught to be useful for tire treads composed of (a) "medium vinyl" polybutadiene, (b) polybutadiene and (c) butadiene/styrene rubbers, German patent DE No. 2936-72 relating to mixtures of polybutadiene containing 35-70% of 1,2-units mixed with polyisoprene rubber and, optionally, with cis polybutadiene or styrene-butadiene rubber for tires, and U.S. Pat. No. 3,827,991, U.S. Pat. No. 4,220,564 and U.S. Pat. No. 4,224,197 relating to combinations of polybutadiene containing at least seventy percent of 1,2-configuration with various other rubbers.

Although such rubber compositions are taught to provide various benefits, some for tire treads, it continues to be desirable to provide a pneumatic tire having a rubber tread having an enhanced rolling resistance and/or treadwear commensurate with reasonable traction qualities.

STATEMENT AND PRACTICE OF INVENTION

In accordance with this invention, a pneumatic tire is provided having an outer circumferential tread adapted to be ground contacting where said tread is prepared from a sulfur curable elastomeric composition comprised of, based on 100 parts by weight rubber (phr), (A) about 20 to about 60, preferably about 25 to about 50, phr medium vinyl polybutadiene rubber having about a 30 to about 55, preferably about 35 to about 48, percent vinyl content, (B) about 10 to about 50, preferably about 10 to about 30, phr cis 1,4-polyisoprene rubber and (C) about 30 to about 70, preferably about 40 to about 60, phr styrene/butadiene copolymer rubber.

In the practice of this invention, the styrene/butadiene copolymer rubber is selected from at least one of styrene/butadiene copolymer prepared by aqueous emulsion polymerization and styrene/butadiene copolymer prepared by organic solution polymerization.

In the practice of this invention, the medium vinyl content of the required polybutadiene refers to the weight percent of monomer content of the polymer in the 1,2-configuration.

The cis 1,4-polyisoprene rubber is selected from at least one of natural and synthetic rubber.

The cis 1,4-polyisoprene rubber typically has a cis 1,4-content of about 96 to 99 weight percent.

The styrene/butadiene copolymer rubber is conventionally composed of a styrene/butadiene ratio in the range of about 10/90 to about 40/60. Although the copolymer is conventionally prepared by aqueous emulsion copolymerization, for some purposes a styrene/butadiene copolymer rubber prepared by organic solution polymerization is preferred because it typically has a narrower molecular weight range and typically a higher average molecular weight which affect its physical properties. Both emulsion and solution polymerization methods are relatively well-known to those having skill in such art.

Such pneumatic tires are conventionally comprised of a generally toroidal shaped carcass with an outer circumferential tread adapted to be ground contacting, spaced beads and sidewalls extending radially from and connecting said tread to said beads.

The medium vinyl polybutadiene typically has about 10 to about 40 percent of its monomer units in a cis 1,4-configuration and, after allowing for the medium vinyl content (1,2-monomer configuration), the remainder of the polymer is considered to be of monomer units in a trans 1,4-configuration.

The medium vinyl polybutadiene, in its unvulcanized state, can typically be additionally characterized by having a ML-4 (100° C.) viscosity in the range of about 40 to about 120.

These polybutadienes, particularly those in the higher ML-4 viscosity range, can optionally be individually oil extended before mixing with various rubber compounding materials for ease of processing. If oil extension is used, usually about 15 to about 35 phr of rubber processing oil is used, usually of the aromatic or aromatic/paraffinic oil type, to provide a ML-4 (100° C.) viscosity of about 40–80.

The invention can be practiced with medium vinyl polybutadiene rubber produced by various processes, such as those already known in the art.

However, it is a particularly desirable feature of this invention that a particular type of medium vinyl polybutadiene be used. Although the mechanism, precise physical or chemical property or polymer structure effect is not understood, at least one of or a combination of, depending on the tire and its service conditions, tire properties have been observed to be further enhanced by using such particular medium vinyl polybutadiene. Such enhanced tire properties include at least one of or a conbination of rolling resistance, skid resistance and tread wear.

Such preferred medium vinyl polybutadiene is of the type prepared by polymerizing 1,3-butadiene with a very small amount of divinyl benzene in a hydrocarbon solvent system, preferably an essentially non-polar aprotic solvent, with an alkyl lithium catalyst, and one or more polar catalyst modifiers to effect the polymer's vinyl content. For further details concerning such type of medium vinyl polybutadiene and a method of preparation, reference may be made to U.S. Pat. No. 4,230,841 and such patent is hereby incorporated herein by reference.

It should readily be understood by one having skill in the art that said tread portion of the pneumatic tire as well as the rubber or other material in the basic carcass normally also containing reinforcing elements in the tread area, can be compounded by methods generally known in the rubber compounding art, such as mixing the various constituent rubbers with various curing aids, such as accelerators, processing additives, such as oils, resins and plasticizers, fillers, pigments, antioxidants and antiozonants and reinforcing materials such as, for example, carbon black.

The tire can be built, shaped, molded and cured by various methods which will be readily apparent to those having skill in the art.

In the practice of this invention, the polymer blend tread can be integral with and adhered to various tire carcass substrate rubber compositions. Typically, such a rubber composition is at least one of a butadiene/styrene copolymer rubber, cis 1,4-polyisoprene (natural or synthetic rubber) and cis1,4-polybutadiene. Optionally, such a blend, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Tire With Tread Composed of Medium Vinyl Polybutadiene, Polyisoprene And Styrene/Butadiene Rubber By Emulsion Polymerization Pneumatic tires of conventional construction (grooved tread, sidewalls, spaced beads, and supporting fabric-reinforced carcass) were built, shaped and cured in a conventional tire mold. The tires were the P195/75R14 type as steel belted (reinforced) radial ply passenger type tires.

One type of tire was prepared as a control and is identified herein as Control X and experimental tires having treads of this invention are identified as Experimental Y.

Control tire X had a tread composed of (A) 70 phr butadiene/styrene rubber and (B) 30 phr low vinyl, or conventional, polybutadiene rubber and is intended to represent a conventional passenger tire.

Experimental tire Y had a tread composed of (A) 25 phr medium vinyl polybutadiene, (B) 25 phr cis 1,4-polyisoprene and (C) 50 phr styrene/butadiene copolymer rubber prepared by emulsion polymerization.

The tread compositions had been compounded using available compounding ingredients comprised of carbon black, rubber processing oil, zinc oxide, stearic acid, resin, antidegradant, sulfur and accelerator.

The tires (X and Y) were mounted on rims, inflated and submitted to testing. The test values for the control were normalized to a value of 100 for comparison purposes. The tire with the experimental tread was tested and its test values compared to the values of the control tire and reported relative to the normalized values of 100.

The tire with the experimental tread rubber composition Y exhibited an improved (reduced) rolling resistance without appreciably degrading its wet and dry skid resistance as compared to control tire X. The treadwear of the tires was about equal.

Table 1 illustrates the rolling resistance, wet and dry skid resistance and treadwear values with the Tire Y having the experimental tread compared to values of control tire X normalized to 100.

TABLE 1

| Measured Values | Control X | Experimental Y |
|---|---|---|
| Rolling resistance | 100 | 109 (reduced, improved) |
| Wet skid resistance | 100 | 100 (equal) |
| Dry skid resistance | 100 | 98 (slightly reduced) |
| Treadwear (16,000 miles) | 100 | 102 (about equal) |

These results are considered important because a definitive improvement in the tire's rolling resistance was obtained without a more normally expected trade-off or reduction in skid resistance and/or treadwear.

The treadwear was a measure of reduction in tread depth after about 16,000 miles of test on a 1983 Ford automobile.

In this Example, the rolling resistance was measured by mounting and inflating the tire on a rim and allowing it to be turned by a 67 inch diameter wheel under about 80 percent of its rated load at a peripheral speed of 50 mph (80 km/h) and the drag force measured. The test is believed to be somewhat standard.

EXAMPLE II

Tire With Tread Composed of Medium Vinyl Polybutadiene, Polyisoprene and Styrene/Butadiene By Solution Polymerization Pneumatic tires of conventional construction (grooved tread, sidewalls, spaced beads, and supporting fabric-reinforced carcass) were built, shaped and cured in a conventional tire mold.

The tires were of the P195/75R14 type which indicates that they were belted, radial ply passenger type tires.

One tire is identified herein as Control A and another tire identified as Experimental B.

Control tire A had a tread composed of (A) 25 phr medium vinyl polybutadiene, (B) 25 phr cis-1,4-polyisoprene and (C) 50 phr styrene/butadiene rubber prepared by aqueous emulsion polymerization. Thus the control tire A had a tread somewhat similar to the experimental passenger tire Y of Example I. tread.

Experimental tire B had a tread composed of (A) 25 phr medium vinyl polybutadiene and (B) 25 phr cis 1,4-polyisoprene and (C) 50 phr styrene/butadiene copolymer rubber prepared by solution polymerization.

The tread compositions had been compounded using available compounding ingredients comprised of carbon black, rubber processing oil, zinc oxide, stearic acid, resin, antidegradant, sulfur and accelerator.

The tires A and B were mounted on rims inflated and submitted to testing. The test values for control were normalized to a value of 100 for comparison purposes. The tire with the experimental tread was tested and its test values compared to the values of the control tire and reported relative to the normalized values of 100.

The tire with the experimental tread rubber composition B exhibited an improved (reduced) rolling resistance without substantial degraded (reduced) skid resistance but with improved treadwear as compared to control tire A, thus showing an advantage of using the styrene/butadiene copolymer prepared by solution polymerization for some purposes.

Table 2 illustrates the comparative rolling resistance, wet and dry skid resistance values and treadwear of the tires.

TABLE 2

| Measured Values | Control A | Experimental B |
| --- | --- | --- |
| Rolling Resistance | 100 | 106 (reduced, improved) |
| Wet Skid Resistance | 100 | 95 (reduced) |
| Dry Skid Resistance | 100 | 97 (reduced) |
| Treadwear (20,000 miles) | 100 | 105 (improved) |

The skid resistance for these Examples (I and II) was a standard test in which the tires (A and B) are individually mounted on opposite sides of a weighted, drawn trailer at various speeds and brakes of the trailer applied and skid force (peak and slide) measured.

The treadwear was compared by actually mounting the control and experimental tires on different automobiles and driving them under controlled conditions, with the position of the tires being periodically positionally interchanged between the automobiles.

In these Examples, the preferred medium vinyl polybutadiene rubber was used. Such rubber was of the hereinbefore described type generally prepared by U.S. Pat. No. 4,230,841 which was incorporated herein by reference. As taught, the medium vinyl polybutadiene is prepared by polymerizing 1,3-butadiene with a very small amount of divinyl benzene in an essentially non-polar aromatic solvent with an alkyl lithium catalyst and at least one polar catalyst modifier.

Representative examples of such solvents are pentane, hexane, heptane, octane, isooctane and cyclohexene, of which hexane is preferred.

Representative examples of alkyl lithium catalysts are methyl lithium, ethyl lithium, propyl lithium, n-butyl lithium, s-butyl lithium, t-butyl lithium and amyl butyl lithium. The n-butyl lithium is preferred.

The amount of catalyst is dependent upon the molecular weight desired for the polymerizaton. The amount of divinylbenzene can be related to the level of active lithium catalyst. The amount of polar compound is dependent upon the vinyl content desired in the polymer. For example, it is described in said patent that between about 0.10 and 1.0 millimols of active alkyl lithium per hundred grams of butadiene can be used and that a mole ratio of divinylbenzene (DVB) to alkyl lithium can be in the range of about 0.1 to about 0.9. It is preferred that the temperature of the polymerization is maintained substantially constant throughout the polymerizaton. Various polar modifiers are prescribed, of which the strong catalyst modifiers are exemplified such as mexamethyl phosphoric acid triamide (HMPA), N,N,N',N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme).

While certain representative embodiments and details have been shown for the purpose of illustrating the invention, it will be apparent to those skilled in this art that various changes and modifications may be made therein without departing from the spirit or scope of the invention.

We claim:

1. A pneumatic tire having an outer circumferential tread adapted to be ground contacting, where said tread is prepared from a sulfur curable elastomeric composition comprised of, based on 100 parts by weight rubber (phr), (A) about 20 to about 60 phr medium vinyl polybutadiene rubber having about a 30 to about 55 percent vinyl content, (B) about 10 to about 50 phr cis 1,4-polyisoprene rubber and (C) about 30 to about 70 phr of at least one rubber selected from the group consisting of styrene/butadiene copolymer prepared by aqueous emulsion polymerization and styrene/butadiene copolymer prepared by organic solution polymerization, where said medium vinyl polybutadiene rubber, in its unvulcanized state has an ML4(100° C.) in the range of about 40 to about 120.

2. The tire of claim 1 where said styrene/butadiene copolymer rubber is selected from at least one of the group consisting of aqueous emulsion co-polymerized styrene and 1,3-butadiene, and solvent solution co-polymerized styrene and 1,3-butadiene and the cis 1,4-polyisoprene rubber is selected from at least one of the group consisting of natural rubber and synthetic rubber.

3. The tire of claim 2 where one or more of said rubbers is oil extended with about 15 to about 35 weight percent rubber processing oil before mixing with any of the other of said rubbers.

4. The tire of claim 2 where said styrene/butadiene rubber is prepared by aqueous emulsion polymerization.

5. The tire of claim 2 where said styrene/butadiene rubber is prepared by organic solution polymerization.

6. The pneumatic tire of claim 2 where said medium vinyl polybutadiene in its uncured state has a ML4(100° C.) in the range of about 40 to about 120 and is of the type prepared by polymerizing 1,3-butadiene with a small amount of divinyl benzene in a hydrocarbon solvent system with an alkyl lithium catalyst and in the presence of at least one polar catalyst modifier.

7. The pneumatic tire of claim 3 where said medium vinyl polybutadiene in its uncured state has an ML4(100° C.) in the range of about 40 to about 120 and is of the type prepared by polymerizing 1,3-butadiene with a small amount of divinyl benzene in a hydrocarbon solvent system with an alkyl lithium catalyst and in the presence of at least one polar catalyst modifier.

8. The tire of claim 6 where said styrene/butadiene rubber is prepared by aqueous emulsion polymerization.

9. The tire of claim 6 where said styrene/butadiene rubber is prepared by organic solvent solution polymerization.

10. A pneumatic tire comprised of a generally toroidal shaped carcass with an outer circumferential tread adapted to be ground contacting, spaced beads and sidewalls extending radially from and connecting said tread to said beads, characterized in that said tread is prepared from a sulfur curable elastomeric composition comprised of, based on 100 parts by weight rubber (phr), (A) about 25 to about 50 phr medium vinyl polybutadiene rubber having about a 35 to about 48 percent vinyl content, (B) about 10 to about 30 phr cis 1,4-polyisoprene rubber and (C) about 40 to about 60 phr of at least one rubber selected from the group consisting of styrene/butadiene copolymer prepared by aqueous emulsion polymerization and styrene/butadiene copolymer prepared by organic solution polymerization, where said medium vinyl polybutadiene rubber, in its vulcanized state has an ML4(100° C.) in the range of about 40 to about 120 and is of the type prepared by polymerizing 1,3-butadiene with a small amount of divinyl benzene in a hydrocarbon solvent with an alkyl lithium catalyst and in the presence of a polar catalyst modifier; and where said tread is integral with and adhered to a carcass substrate rubber composition of at least one of butadiene/styrene copolymer rubber, cis 1,4-polyisoprene rubber and cis 1,4-polybutadiene rubber.

11. The tire of claim 10 where said styrene/butadiene rubber is prepared by aqueous emulsion polymerization.

12. The tire of claim 11 where said styrene/butadiene rubber is prepared by hydrocarbon solvent solution polymerization.

* * * * *

UNITED STATES PATENT AND TRADEMARK OFFICE
CERTIFICATE OF CORRECTION

PATENT NO. : 4,530,959
DATED : July 23, 1985
INVENTOR(S) : Robert G. Armbruster and Richard M. Scriver It is certified that error appears in the above-identified patent and that said Letters Patent is hereby corrected as shown below:

Column 1, lines 43 & 44 reads - German patent DE No. 2936-72 - should read "German Patent No. DE 2936-782".

Signed and Sealed this

Second Day of September 1986

[SEAL]

Attest:

DONALD J. QUIGG

Attesting Officer

Commissioner of Patents and Trademarks